United States Patent
Yang et al.

(10) Patent No.: US 10,785,779 B2
(45) Date of Patent: Sep. 22, 2020

(54) METHOD FOR DETERMINING PRIORITY OF RESOURCE, PROCESSING DEVICE, SYSTEM, AND UE

(71) Applicant: ZTE CORPORATION, Guangdong (CN)

(72) Inventors: Jin Yang, Guangdong (CN); Youxiong Lu, Guangdong (CN); Wenhuan Wang, Guangdong (CN); Shuanghong Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/301,351

(22) PCT Filed: May 11, 2017

(86) PCT No.: PCT/CN2017/083998
§ 371 (c)(1),
(2) Date: Nov. 13, 2018

(87) PCT Pub. No.: WO2017/193972
PCT Pub. Date: Nov. 16, 2017

(65) Prior Publication Data
US 2019/0200370 A1    Jun. 27, 2019

(30) Foreign Application Priority Data
May 13, 2016    (CN) .......................... 2016 1 0322471

(51) Int. Cl.
*H04W 72/10* (2009.01)
*H04W 24/10* (2009.01)
(Continued)

(52) U.S. Cl.
CPC ........... *H04W 72/10* (2013.01); *H04W 24/10* (2013.01); *H04W 76/14* (2018.02); *H04W 92/18* (2013.01)

(58) Field of Classification Search
None
See application file for complete search history.

(56) References Cited

U.S. PATENT DOCUMENTS

2015/0215903 A1* 7/2015 Zhao ..................... H04W 72/04
                                                          370/329
2016/0066337 A1    3/2016 Sartori et al.
(Continued)

FOREIGN PATENT DOCUMENTS

CN    105338548 A    2/2016

OTHER PUBLICATIONS

U.S. Appl. No. 62/332,851, filed May 6, 2016, by Rajagopal (Year: 2016)*

(Continued)

*Primary Examiner* — Jay L Vogel
(74) *Attorney, Agent, or Firm* — Knobbe, Martens, Olson & Bear, LLP

(57) ABSTRACT

Disclosed are a method for determining a resource priority, a processing device, a processing system and a UE. The method for determining the resource priority can include: performing, on a physical sidelink control channel (PSCCH), at least one of the following operations: performing energy detection to obtain a detection result and performing information decoding to obtain a decoding result; and weighting at least one of the detection result and the decoding result to determine a priority of a PSCCH resource, or determining the priority of the PSCCH resource according to at least one of the detection result and the decoding result.

17 Claims, 5 Drawing Sheets

Perform at least one of the following operations on a PSCCH: performing energy detection to obtain a detection result and performing information decoding to obtain a decoding result — S202

Weight at least one of the detection result and the decoding result to determine a priority of a PSCCH resource, or determine the priority of the PSCCH resource according to at least one of the detection result and the decoding result — S204

(51) Int. Cl.
*H04W 76/14* (2018.01)
*H04W 92/18* (2009.01)
*H04W 24/08* (2009.01)
*H04W 8/00* (2009.01)
*H04L 5/00* (2006.01)
*H04W 48/16* (2009.01)
*H04W 72/12* (2009.01)

(56) References Cited

U.S. PATENT DOCUMENTS

| | | | |
|---|---|---|---|
| 2016/0295624 A1* | 10/2016 | Novlan | H04W 72/04 |
| 2017/0048905 A1* | 2/2017 | Yun | H04L 5/0048 |
| 2017/0188391 A1* | 6/2017 | Rajagopal | H04W 74/0816 |
| 2018/0206260 A1* | 7/2018 | Khoryaev | H04W 72/1242 |
| 2018/0213438 A1* | 7/2018 | Muraoka | H04W 28/06 |
| 2019/0182840 A1* | 6/2019 | Feng | H04W 4/44 |

OTHER PUBLICATIONS

International Search Report dated Jul. 28, 2017 for International Application No. PCT/CN2017/083998, 5 pages.
Written Opinion of the International Searching Authority dated Jul. 28, 2017 for International Application No. PCT/CN2017/083998, 4 pages.
Interdigital Communications; On Sensing with semi-persistent transmission for V2V sidelink, R1-163366, 3 GPP TSG-RAN WG1 Meeting #84BIS, Apr. 15, 2016.
CATT; "Discussion on UE autonomous resource allocation in PC5-based V2V, R1-162267", 3 GPP TSG RAN WG1 Meeting #84BIS, Apr. 15, 2016.
ZTE; "Discussion on V2V SPS resource scheme, R1-162413", 3GPP TSG-RAN WG1 Meeting #84 BIS, Apr. 15, 2016.

* cited by examiner (a) PSCCH with a normal cyclic prefix (b) PSCCH with an extended cyclic prefix ▨ Pilot symbol

METHOD FOR DETERMINING PRIORITY OF RESOURCE, PROCESSING DEVICE, SYSTEM, AND UE

CROSS REFERENCE TO RELATED APPLICATIONS

This application the U.S. national phase application under 35 U.S.C. 371 of International patent application PCT/CN2017/083998, filed on May 11, 2017 which claims priority to a Chinese patent application No. 201610322471.3 filed on May 13, 2016, disclosure of each of which is incorporated herein by reference in its entirety.

TECHNICAL FIELD

The present disclosure relates to, but is not limited to, the field of communications and, in particular, relates to a method for determining a resource priority, a processing device, a processing system and a user equipment (UE).

BACKGROUND

In a device-to-device (D2D) communication system in the existing art, when a service needs to be transmitted between user equipments (UEs), service data between the UEs is directly transmitted from a data source UE to a target UE through an air interface without being forwarded by a base station. As shown in FIG. 1, a wireless link between the UEs in the D2D system is referred to as a sidelink. The D2D communication mode has distinct characteristics from the traditional cellular system communication mode. For short-distance communication users capable of using the D2D communication mode, the D2D transmission saves wireless spectrum resources, decreases the data transmission pressure of a core network, reduces occupation of system resources, increases the spectrum efficiency of the cellular communication system, reduces the transmission power consumption of a terminal, and saves network operation costs to a large extent.

In the cellular communication system in the existing art, radio resources of the UE are uniformly controlled and scheduled by an evolved NodeB (eNB), the eNB indicates downlink resources or uplink resources configured by the UE. The UE receives data signals transmitted by the eNB on corresponding downlink resources or transmits signals to the eNB on corresponding uplink resources, according to a configuration indication of the eNB. In the Long Term Evolution (LTE) system, the eNB can dynamically schedule and configure required resources flexibly according to requirements of the UE.

In the D2D communication system, data transmission is directly performed between the UEs. The UE at a transmitting end may obtain physical sidelink control channel (PSCCH) resources and physical sidelink shared channel (PSSCH) resources for the D2D communications according to the scheduling and configuration of a network side, and may also contend for and select resources in the given PSCCH and PSSCH resource pool for D2D communication control and data information transmission.

A Vehicle-to-Everything (V2X) system refers to a system that provides vehicle information through devices mounted on vehicles such as sensors, vehicle-mounted terminals and electronic tags, implements interconnection and intercommunication of Vehicle-to-Vehicle (V2V), Vehicle-to-Pedestrian (V2P) and Vehicle-to-Infrastructure (V2I) by using various communication technologies, effectively uses information by way of extraction, sharing, etc. on an information network platform, effectively manages and controls vehicles, and provides comprehensive services for vehicles. The V2X may perform communication-based vehicle information notification and collision hazard warning, and, through advanced wireless communication technologies and a new generation of information processing technologies, performs real-time information interactions between vehicles and between vehicles and roadside infrastructure, informs each other of the current status (including position, speed, acceleration and traveling path of the vehicle) and the learned road environment information, cooperatively senses road hazard conditions and provides various collision warning information in time to prevent road traffic accidents, and thus become a new way to solve road traffic safety problems.

In recent years, with the development of new mobile communication technologies, it has become a research hotspot to solve V2X communications on the basis of the Long Term Evolution (LTE) technology. The D2D communication mode may be applied to short-distance communications between vehicles, which serves as a special application of the D2D communication mode.

However, in the existing art, the following problems are existed in the D2D/V2V communication process: when the eNB schedules sidelink resources for the UE, or when the UE selects resources in a sidelink resource pool, the lack of information on the use of the sidelink resources affects effectiveness of resource scheduling and selection, leading to lower utilization efficiency of the sidelink resources.

In view of the above problem in the existing art, no effective solution has yet been proposed.

SUMMARY

The following is a summary of the subject matter described herein in detail. This summary is not intended to limit the scope of the claims.

Embodiments of the present disclosure provide a method for determining a resource priority, a processing device, a processing system and a UE to at least resolve the problem of low resource utilization efficiency in the existing art.

An aspect of the present application provides a method for determining a resource priority, including the steps described below:

performing, on a physical sidelink control channel (PSCCH), at least one of the following operations: performing energy detection to obtain a detection result, and performing information decoding to obtain a decoding result; and weighting at least one of the detection result and the decoding result to determine a priority of a PSCCH resource, or determining the priority of the PSCCH resource according to at least one of the detection result and the decoding result.

In an exemplary embodiment, the step of performing the energy detection on the PSCCH to obtain the detection result may include at least one of the following: detecting pilot energy or pilot power on the PSCCH resource to obtain the detection result; and detecting total energy or total power on the PSCCH resource to obtain the detection result; where the obtained detection result includes an energy value or a power value.

In an exemplary embodiment, the step of detecting the pilot energy or the pilot power on the PSCCH resource to obtain the detection result may include: detecting signal energy or signal power of a resource element (RE) for mapping pilot in the PSCCH resource, or signal energy or signal power of a symbol for mapping the pilot in the PSCCH resource; or the detecting the total energy or the total power on the PSCCH resource to obtain the detection result may include: detecting signal energy or signal power of all REs in the PSCCH resource;

the PSCCH resource includes a subframe in time domain and a resource block (RB) pair in frequency domain.

In an exemplary embodiment, the step of performing the information decoding on the PSCCH to obtain the decoding result may include: receiving and decoding sidelink control information (SCI) carried on the PSCCH resource, and determining whether the decoding result is correct or incorrect.

In an exemplary embodiment, the step of weighting at least one of the detection result and the decoding result to determine the priority of the PSCCH resource may include the steps described below:

acquiring at least one of the following: a first correspondence between a value of the detection result of the PSCCH resource and a weighted energy value, and a second correspondence between the decoding result of the PSCCH resource and a weighted decoding value;

performing at least one of the following operations: determining, according to the detection result and the acquired first correspondence, the weighted energy value corresponding to the detection result; or determining, according to the decoding result and the acquired second correspondence, the weighted decoding value corresponding to the decoding result; and determining the priority of the PSCCH resource according to at least one of the determined weighted energy value and the determined weighted decoding value.

In an exemplary embodiment, the step of weighting at least one of the detection result and the decoding result to determine the priority of the PSCCH resource may include: determining the priority of the PSCCH resource with a weighted processing rule according to at least one of the weighted energy value and the weighted decoding value of the PSCCH. The priority of the PSCCH resource includes at least one of a priority index and a priority level.

In an exemplary embodiment, the weighted processing rule may include: performing a linear operation on the at least one of the weighted energy value and the weighted decoding value of the PSCCH, and determining the priority of the PSCCH resource according to a result of the linear operation.

In an exemplary embodiment, the weighted processing rule may include at least one of the following:

adding the weighted energy value and the weighted decoding value of the PSCCH to determine the priority index of the PSCCH resource;

multiplying the weighted energy value and the weighted decoding value of the PSCCH respectively by corresponding weighted coefficients, and adding the multiplied weighted energy value and the multiplied weighted decoding value to determine the priority index of the PSCCH resource; and multiplying the weighted energy value by the weighted decoding value of the PSCCH to determine the priority index of the PSCCH resource.

In an exemplary embodiment, after the priority index of the PSCCH resource is determined, the method may further include: converting the priority index of the PSCCH resource into the priority level according to a priority index-level conversion table. The priority index-level conversion table defines the priority level uniquely corresponding to the priority index.

In an exemplary embodiment, the weighted processing rule may include: determining the priority of the PSCCH resource with a second priority level table according to the at least one of the weighted energy value and the weighted decoding value of the PSCCH. The second priority level table defines the priority level uniquely corresponding to the at least one of the weighted energy value and the weighted decoding value.

In an exemplary embodiment, the step of determining the priority of the PSCCH resource according to the at least one of the detection result and the decoding result may include: determining the priority of the PSCCH resource with a first priority level table according to the at least one of the detection result and the decoding result of the PSCCH resource. The first priority level table defines a priority level uniquely corresponding to the at least one of the detection result and the decoding result of the PSCCH resource, and the detection result of the PSCCH resource includes an energy value or a power value.

In an exemplary embodiment, at least one of the following is configured according to a system pre-definition or via network-side higher layer signaling: the first priority level table; the first correspondence between the value of the detection result of the PSCCH resource and the weighted energy value; the second correspondence between the decoding result of the PSCCH resource and the weighted decoding value; the weighted processing rule; the priority index-level conversion table; and the second priority level table.

In an exemplary embodiment, after the priority of the PSCCH resource is determined, the method may further include: performing, by a user equipment (UE), at least one of selection and competition of the PSCCH resources according to a PSCCH resource priority list; or reporting, by the UE, the PSCCH resource priority list to a network side via at least one of physical layer signaling and higher layer signaling to enable the network side to schedule the PSCCH resources according to the PSCCH resource priority list. The PSCCH resource priority list includes priority information of the PSCCH resources.

Another aspect of the present application provides a UE for determining a resource priority, including: a processing module, which is configured to perform, on a physical sidelink control channel (PSCCH), at least one of the following operations: performing energy detection to obtain a detection result, and performing information decoding to obtain a decoding result; and a determining module, which is configured to weight at least one of the detection result and the decoding result to determine a priority of a PSCCH resource, or determine the priority of the PSCCH resource according to at least one of the detection result and the decoding result.

In an exemplary embodiment, the processing module may be configured to perform the energy detection on the PSCCH to obtain the detection result by at least one of the following: detecting pilot energy or pilot power on the PSCCH resource to obtain the detection result; and detecting total energy or total power on the PSCCH resource to obtain the detection result; where the obtained detection result includes an energy value or a power value.

In an exemplary embodiment, the processing module may be configured to detect the pilot energy or pilot power on the PSCCH resource to obtain the detection result by detecting signal energy or signal power of a resource element (RE) for mapping pilot in the PSCCH resource or detecting signal energy or signal power of a symbol for mapping the pilot in the PSCCH resource; or the processing module may be configured to detect the total energy or the total power on the PSCCH resource to obtain the detection result by detecting signal energy or signal power of all REs in the PSCCH resource;

the PSCCH resource includes a subframe in time domain and a resource block (RB) pair in frequency domain.

In an exemplary embodiment, the processing module may be configured to perform the information decoding on the PSCCH to obtain the decoding result by receiving and decoding sidelink control information (SCI) carried on the PSCCH resource, and determining whether the decoding result is correct or incorrect.

In an exemplary embodiment, the determining module may be configured to weight at least one of the detection result and the decoding result to determine the priority of the PSCCH resource by the following:

acquiring at least one of the following: a first correspondence between a value of the detection result of the PSCCH resource and a weighted energy value, and a second correspondence between the decoding result of the PSCCH resource and a weighted decoding value;

performing at least one of the following operations: determining, according to the detection result and the acquired first correspondence, the weighted energy value corresponding to the detection result; or determining, according to the decoding result and the acquired second correspondence, the weighted decoding value corresponding to the decoding result; and determining the priority of the PSCCH resource according to the at least one of the determined weighted energy value and the determined weighted decoding value.

In an exemplary embodiment, the determining module is configured to weight the at least one of the detection result and the decoding result to determine the priority of the PSCCH resource by determining the priority of the PSCCH resource with a weighted processing rule according to the at least one of the weighted energy value and the weighted decoding value of the PSCCH; where the priority of the PSCCH resource includes at least one of a priority index and a priority level.

In an exemplary embodiment, the weighted processing rule may include: performing a linear operation on the at least one of the weighted energy value and the weighted decoding value of the PSCCH, and determining the priority of the PSCCH resource according to a result of the linear operation.

In an exemplary embodiment, the weighted processing rule may include at least one of the following:

adding the weighted energy value and the weighted decoding value of the PSCCH to determine the priority index of the PSCCH resource;

multiplying the weighted energy value and the weighted decoding value of the PSCCH respectively by corresponding weighted coefficients, and adding the multiplied weighted energy value and the multiplied weighted decoding value to determine the priority index of the PSCCH resource; and multiplying the weighted energy value by the weighted decoding value of the PSCCH to determine the priority index of the PSCCH resource.

In an exemplary embodiment, the UE may further include: a conversion module, which is configured to convert the priority index of the PSCCH resource into the priority level according to a priority index-level conversion table after the determining module determines the priority index of the PSCCH resource. The priority index-level conversion table defines the priority level uniquely corresponding to the priority index.

In an exemplary embodiment, the weighted processing rule may include: determining the priority of the PSCCH resource with a second priority level table according to the at least one of the weighted energy value and the weighted decoding value of the PSCCH. The second priority level table defines the priority level uniquely corresponding to the at least one of the weighted energy value and the weighted decoding value.

In an exemplary embodiment, the determining module may be configured to determine the priority of the PSCCH resource according to at least one of the detection result and the decoding result by: determining the priority of the PSCCH resource with a first priority level table according to the at least one of the detection result and the decoding result of the PSCCH resource. The first priority level table defines a priority level uniquely corresponding to the at least one of the detection result and the decoding result of the PSCCH resource, and the detection result of the PSCCH resource includes an energy value or a power value.

In an exemplary embodiment, the UE may further include: an information determining module, which is configured to determine at least one of the following according to a system pre-definition or by receiving network-side higher layer signaling: the first priority level table; the first correspondence between the value of the detection result of the PSCCH resource and the weighted energy value; the second correspondence between the decoding result of the PSCCH resource and the weighted decoding value; the weighted processing rule; the priority index-level conversion table; and the second priority level table.

In an exemplary embodiment, the UE may further include at least of a selecting module and a reporting module. The selecting module is configured to perform at least one of selection and competition of the PSCCH resources according to a PSCCH resource priority list after the determining module determines the priority of the PSCCH resource. The reporting module is configured to report the PSCCH resource priority list to a network side via at least one of physical layer signaling and higher layer signaling after the determining module determines the priority of the PSCCH resource. The PSCCH resource priority list includes priority information of the PSCCH resources.

Another aspect of the present application provides a processing device for a resource priority, including: a receiving module and a scheduling module. The receiving module is configured to receive a physical sidelink control channel (PSCCH) resource priority list reported by a user equipment. The PSCCH resource priority list includes priority information of a plurality of PSCCH resources; and a priority of one of the PSCCH resources is determined by the following: (i) performing at least one of the following operations on the PSCCH: performing energy detection to obtain a detection result, and performing information decoding to obtain a decoding result; and (ii) weighting at least one of the detection result and the decoding result to determine the priority of the one of the PSCCH resource; or, determining the priority of the one of the PSCCH resource according to at least one of the detection result and the decoding result. The scheduling module is configured to schedule the PSCCH resources according to the PSCCH resource priority list.

Another aspect of the present application provides a processing system for a resource priority, including a network side and a user equipment (UE). The UE includes:

a processing module, which is configured to perform at least one of the following operations on a physical sidelink control channel (PSCCH): performing energy detection to obtain a detection result and performing information decoding to obtain a decoding result; and a determining module, which is configured to weight at least one of the detection result and the decoding result to determine a priority of a PSCCH resource, or determine the priority of the PSCCH resource according to at least one of the detection result and the decoding result; and the network side includes: a receiving module, which is configured to receive a PSCCH resource priority list reported by the UE; where the PSCCH resource priority list includes priority information of a plurality of PSCCH resources; and a scheduling module, which is configured to schedule the PSCCH resources according to the PSCCH resource priority list.

In an exemplary embodiment, the UE may further include at least of a selecting module and a reporting module. The selecting module is configured to perform at least one of selection or competition of the PSCCH resource according to the PSCCH resource priority list after the determining module determines the priority of the PSCCH resource. The reporting module is configured to report the PSCCH resource priority list to the network side via at least one of physical layer signaling and higher layer signaling after the determining module determines the priority of the PSCCH resource.

Another aspect of the present application provides a machine-readable medium. The machine-readable medium is configured to store program codes for performing the method for determining the resource priority described above.

In the present application, at least one of the following operations is performed on the PSCCH: performing the energy detection to obtain the detection result or performing the information decoding to obtain the decoding result; and weighting at least one of the detection result and the decoding result to determine the priority of the PSCCH resource, or determining the priority of the PSCCH resource according to the at least one of the detection result and the decoding result. In this way, more effective resource selection or scheduling is achieved through obtaining a resource priority, thereby resolving the problem of low resource utilization efficiency in the existing art, improving a resource utilization rate, and reducing interference.

Other aspects can be understood after the drawings and detailed description are read and understood.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

The present application will be described hereinafter in detail through embodiments with reference to the accompanying drawings. It is to be noted that if not in collision, the embodiments and features therein in the present application may be combined with each other. It is to be noted that the terms "first", "second" and the like in the description, claims and drawings of the present application are used to distinguish between similar objects and are not necessarily used to describe a particular order or sequence.

Embodiment 1

Figure 1:
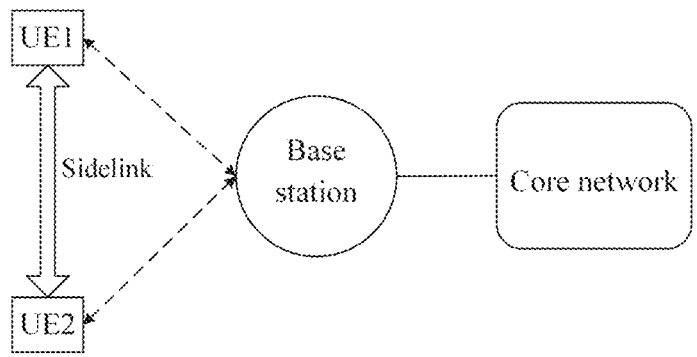
FIG. 1 is a schematic diagram of a D2D communication architecture according to an embodiment of the present disclosure.

The embodiment of the present application may be executed on a network architecture shown in FIG. 1. FIG. 1 is a schematic diagram of a D2D communication architecture according to an embodiment of the present disclosure. As shown in FIG. 1, the network architecture includes: a UE1, a UE2, a base station and a core network. The UE1 and the UE2 communicate with each other through a sidelink and may both be connected to the base station; and the base station may access the core network.

Figure 2:
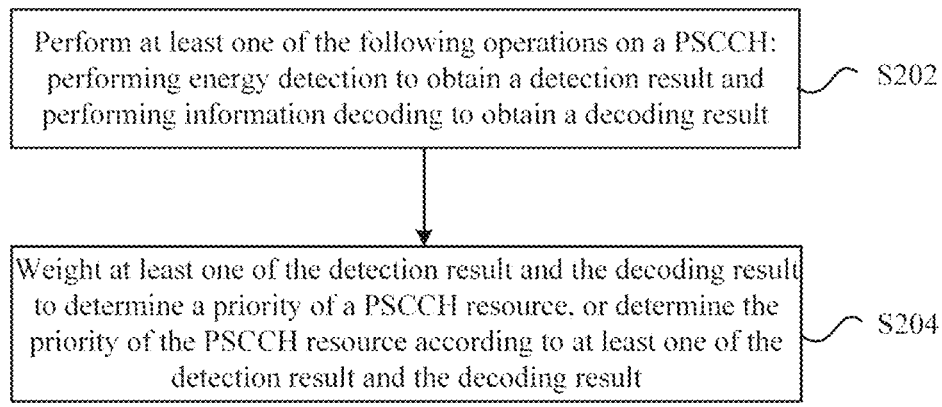
FIG. 2 is a flowchart of a method for determining a resource priority according to an embodiment of the present disclosure.

This embodiment provides a method for determining a resource priority executed on the D2D communication architecture. FIG. 2 is a flowchart of a method for determining a resource priority according to an embodiment of the present disclosure. As shown in FIG. 2, the method includes the steps described below.

In step S202, at least one of the following operations is performed on a physical sidelink control channel (PSCCH): performing energy detection to obtain a detection result and performing information decoding to obtain a decoding result.

In step S204, at least one of the detection result and the decoding result is weighted to determine a priority of a PSCCH resource, or the priority of the PSCCH resource is determined according to the at least one of the detection result and the decoding result.

In the above steps, at least one of the following operations is performed on the physical sidelink control channel (PSCCH): performing the energy detection to obtain the detection result or performing the information decoding to obtain the decoding result; and weighting at least one of the detection result and the decoding result to determine the priority of the PSCCH resource, or determining the priority of the PSCCH resource according to the at least one of the detection result and the decoding result. In this way, more effective resource selection or scheduling is achieved through obtaining a resource priority, thereby resolving the problem of low resource utilization efficiency in the existing art, improving a resource utilization rate, and reducing interference.

In an exemplary embodiment, the above steps may be executed by a terminal (the UE1 and the UE2 in FIG. 1) and the like, but it is not limited to this.

In this embodiment, the method for performing the energy detection on the PSCCH may include at least one of the following steps: detecting pilot energy or pilot power on the PSCCH resource to obtain the detection result; and detecting total energy or total power on the PSCCH resource to obtain the detection result. Where the obtained detection result includes an energy value or a power value.

In an exemplary embodiment, the PSCCH resource includes a subframe in time domain and a resource block (RB) pair in frequency domain. The step of detecting the pilot energy or pilot power on the PSCCH resource to obtain the detection result may include: detecting signal energy or signal power of a resource element (RE) for mapping pilot in the PSCCH resource, or signal energy or signal power of a symbol for mapping the pilot in the PSCCH resource. The step of detecting the total energy or total power on the PSCCH resource to obtain the detection result may include: detecting signal energy or signal power of all REs in the PSCCH resource. In an exemplary embodiment, the step of performing the information decoding on the PSCCH to obtain the decoding result may include: receiving and decoding sidelink control information (SCI) carried on the PSCCH resource, and determining whether the decoding result is correct or incorrect.

In an exemplary embodiment, the step of weighting at least one of the detection result and the decoding result to determine the priority of the PSCCH resource may include S11-S13.

In S11, at least one of the following is acquired: a first correspondence between a value of the detection result of the PSCCH resource and a weighted energy value, and a second correspondence between the decoding result of the PSCCH resource and a weighted decoding value.

In S12, at least one of the following operations is performed: determining, according to the detection result and the acquired first correspondence, the weighted energy value corresponding to the detection result; or determining, according to the decoding result and the acquired second correspondence, the weighted decoding value corresponding to the decoding result.

In S13, the priority of the PSCCH resource is determined according to at least one of the determined weighted energy value and the determined weighted decoding value.

In an exemplary embodiment, the step of weighting at least one of the detection result and the decoding result to determine the priority of the PSCCH resource may include: determining the weighted decoding value according to the decoding result of the PSCCH resource and the second correspondence. The second correspondence defines a weighted value corresponding to a correct information decoding result and a weighted value corresponding to an incorrect information decoding result.

In an exemplary embodiment, the step of weighting at least one of the detection result and the decoding result to determine the priority of the PSCCH resource may include: determining the priority of the PSCCH resource according to a weighted processing rule and at least one of the weighted energy value and the weighted decoding value of the PSCCH. The priority of the PSCCH resource includes at least one of the following: a priority index and a priority level. The priority index may be a specific value; and a priority order corresponding to priority indexes is defined according to a certain rule. The priority level may be a divided level such as a level A, a level B and a level C, and one level may correspond to priority indexes in a certain range.

In an exemplary embodiment, the weighted processing rule may be: performing a linear operation on the at least one of the weighted energy value and the weighted decoding value of the PSCCH, and determining the priority of the PSCCH resource according to a result of the linear operation.

For example, the weighted processing rule may include, but is not limited to, at least one of the following: the weighted energy value and the weighted decoding value of the PSCCH is added together to determine the priority index of the PSCCH resource; the weighted energy value and the weighted decoding value of the PSCCH are multiplied respectively by corresponding weighted coefficients, and the multiplied weighted energy value and the multiplied weighted decoding value are added together to determine the priority index of the PSCCH resource; and the weighted energy value is multiplied by the weighted decoding value of the PSCCH to determine the priority index of the PSCCH resource.

In an exemplary embodiment, after the priority index of the PSCCH resource is determined, the method in this embodiment may further include: converting the priority index of the PSCCH resource into the priority level according to a priority index-level conversion table. The priority index-level conversion table defines the priority level uniquely corresponding to the priority index.

In an exemplary embodiment, the weighted processing rule may be: determining the priority of the PSCCH resource with a second priority level table according to the at least one of the weighted energy value and the weighted decoding value of the PSCCH. The second priority level table defines the priority level uniquely corresponding to the at least one of the weighted energy value and the weighted decoding value.

In an exemplary embodiment, the step of determining the priority of the PSCCH resource according to at least one of the detection result and the decoding result may include: determining the priority of the PSCCH resource with a first priority level table according to the at least one of the detection result and the decoding result of the PSCCH resource. The first priority level table defines the priority level uniquely corresponding to at least one of the detection result and the decoding result of the PSCCH resource, and the detection result of the PSCCH resource includes the energy value or the power value.

In this embodiment, the first priority level table, the first correspondence between the value of the detection result of the PSCCH resource and the weighted energy value, the second correspondence between the decoding result of the PSCCH resource and the weighted decoding value, the weighted processing rule, the priority index-level conversion table and the second priority level table may be configured according to a system pre-definition or according to an indication from a network-side via higher layer signaling.

In an exemplary embodiment, after the priority of the PSCCH resource is determined, the method in this embodiment may further include that a user equipment (UE) performs at least one of selection and competition of the PSCCH resources according to a PSCCH resource priority list; or that the UE reports the PSCCH resource priority list to a network side via at least one of physical layer signaling and higher layer signaling. The PSCCH resource priority list includes priority information of a plurality of PSCCH resources. After the UE reports the PSCCH resource priority list to the network side via the at least one of the physical layer signaling and the higher layer signaling, the network side schedules the PSCCH resources according to the PSCCH resource priority list.

In this embodiment, an entity of the network side (such as the base station in FIG. 1) may include, but is not limited to, one of: an evolved NodeB (eNB), a Relay Node (RN), a Multi-cell Coordination Entity (MCE), a GateWay (GW), a Mobile Management Entity (MME), an Evolved Universal Terrestrial Radio Access Network (EUTRAN), and an Operation Administration and Maintenance (OAM) Manager.

In an exemplary embodiment, after the priority of the PSCCH resource is determined, the method in this embodiment may further include: performing at least one of selection and competition of the PSCCH resources according to the PSCCH resource priority list. The PSCCH resource priority list includes the priority information of the PSCCH resources.

Figure 3:
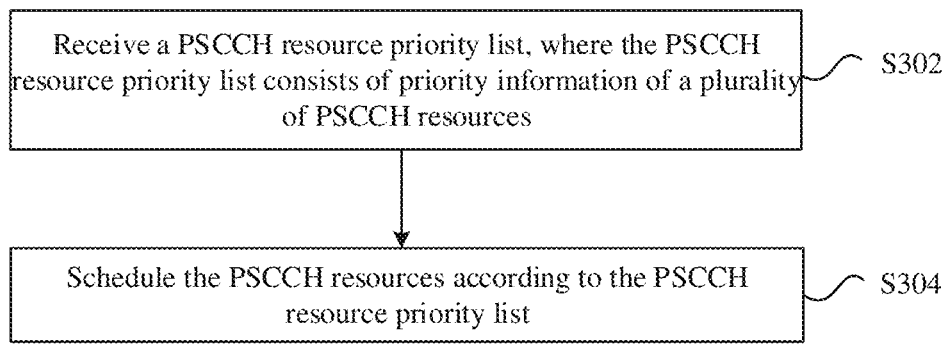
FIG. 3 is a flowchart of a method for processing a resource priority according to an embodiment of the present disclosure.

This embodiment further provides a method for processing the resource priority performed on the D2D communication architecture. FIG. 3 is a flowchart of a method for processing a resource priority according to an embodiment of the present disclosure. As shown in FIG. 3, the method includes the steps S302-S304 described below.

In step S302, a PSCCH resource priority list is received. The PSCCH resource priority list includes priority information of a plurality of PSCCH resources.

In step S304, the PSCCH resources are scheduled according to the PSCCH resource priority list.

In an exemplary embodiment, the above steps may be executed by a base station (the base station in FIG. 1) and the like, but it is not limited to this.

From the description of the embodiments described above, it will be clear to those skilled in the art that the methods in the embodiments described above may be implemented by software and a necessary general-purpose hardware platform, or may of course be implemented by hardware, but in many cases, the former is a preferred implementation mode. Based on this understanding, the solution provided by the present application substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the methods according to the embodiments of the present application.

Embodiment 2

This embodiment provides a UE for determining a resource priority, and a processing device and a processing system for the resource priority, which are used for implementing the above-mentioned embodiments and exemplary embodiments. What has been described is not repeated here. As used below, the term "module" may be software, hardware or a combination thereof capable of implementing predetermined functions. The devices in the embodiments described below are preferably implemented by software, but implementation by hardware or by a combination of software and hardware is also possible and conceived.

Figure 4:
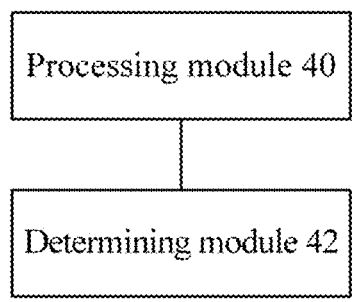
FIG. 4 is a block diagram of a UE for determining a resource priority according to an embodiment of the present disclosure.

FIG. 4 is a block diagram of a user equipment (UE) for determining a resource priority according to an embodiment of the present disclosure. As shown in FIG. 4, the UE includes a processing module 40 and a determining module 42.

The processing module 40 is configured to perform, on a physical sidelink control channel (PSCCH), at least one of the following operations: performing energy detection to obtain a detection result and performing information decoding to obtain a decoding result.

The determining module 42 is configured to weight at least one of the detection result and the decoding result to determine a priority of a PSCCH resource, or determine the priority of the PSCCH resource according to at least one of the detection result and the decoding result.

It is to be noted that the solutions in the method embodiments for determining the resource priority may be implemented in the UE for determining the resource priority in this embodiment in correspondence to the method. The solutions are not repeated herein.

Figure 5:
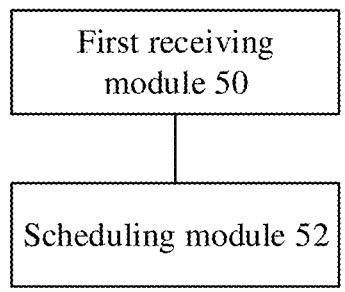
FIG. 5 is a block diagram of a processing device for a resource priority according to an embodiment of the present disclosure.

FIG. 5 is a block diagram of a processing device for a resource priority according to an embodiment of the present disclosure. As shown in FIG. 5, the device includes a receiving module 50 and a scheduling module 52.

The receiving module 50 is configured to receive a PSCCH resource priority list reported by a user equipment. The PSCCH resource priority list includes priority information of a plurality of PSCCH resources; and a priority of one of the PSCCH resources is determined by the following: (i) performing at least one of the following operations on the PSCCH: performing energy detection to obtain a detection result, and performing information decoding to obtain a decoding result; and (ii) weighting at least one of the detection result and the decoding result to determine the priority of the one of the PSCCH resource; or, determining the priority of the one of the PSCCH resource according to the at least one of the detection result and the decoding result.

The scheduling module 52 is configured to schedule the PSCCH resources according to the PSCCH resource priority list.

Figure 6:
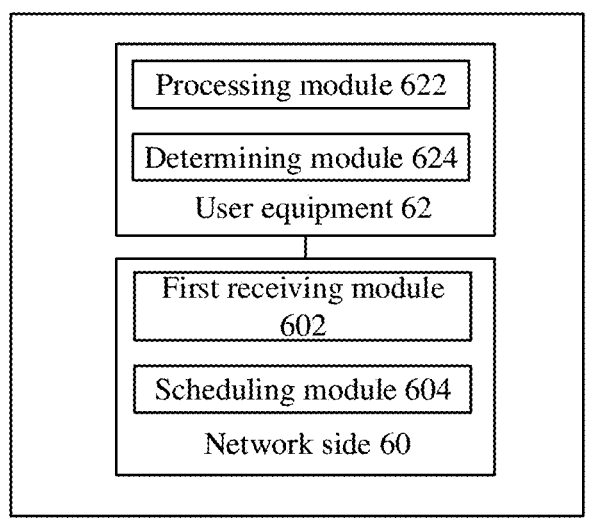
FIG. 6 is a block diagram of a processing system for a resource priority according to an embodiment of the present disclosure.

FIG. 6 is a block diagram of a processing system for a resource priority according to an embodiment of the present disclosure. As shown in FIG. 6, the system includes a network side 60 and a user equipment 62. The user equipment 62 includes a processing module 622 and a determining module 624.

The processing module 622 is configured to perform at least one of the following operations on a physical sidelink control channel (PSCCH): performing energy detection to obtain a detection result and performing information decoding to obtain a decoding result.

The determining module 624 is configured to weight at least one of the detection result and the decoding result to determine a priority of a PSCCH resource, or determine the priority of the PSCCH resource according to at least one of the detection result and the decoding result.

The network side 60 includes a receiving module 602 and a scheduling module 604.

The receiving module 602 is configured to receive a PSCCH resource priority list reported by the UE. The PSCCH resource priority list includes priority information of a plurality of PSCCH resources.

The scheduling module 604 is configured to schedule the PSCCH resources according to the PSCCH resource priority list.

In an exemplary embodiment, in the system in FIG. 6, the user equipment 62 may further include at least one of a selecting module and a reporting module. The selecting module is configured to perform at least one of selection or competition of the PSCCH resource according to the PSCCH resource priority list after the determining module 624 determines the priority of the PSCCH resource. The reporting module is configured to report the PSCCH resource priority list to the network side via at least one of physical layer signaling and higher layer signaling after the determining module 624 determines the priority of the PSCCH resource.

The various modules described above may be implemented by software or hardware. Implementation by hardware may, but may not necessarily, be performed by the following methods: the various modules described above are realized by a same processor or by their respective processors.

Embodiment 3

The present application will be described below in detail through this embodiment.

In a D2D/V2V communication system, a transmitting UE which has data to be transmitted sends sidelink control information (SCI) on a physical sidelink control channel (PSCCH) for indicating resource configuration-related information of a physical sidelink shared channel (PSSCH), and sends sidelink data on the indicated PSSCH.

Figure 7:
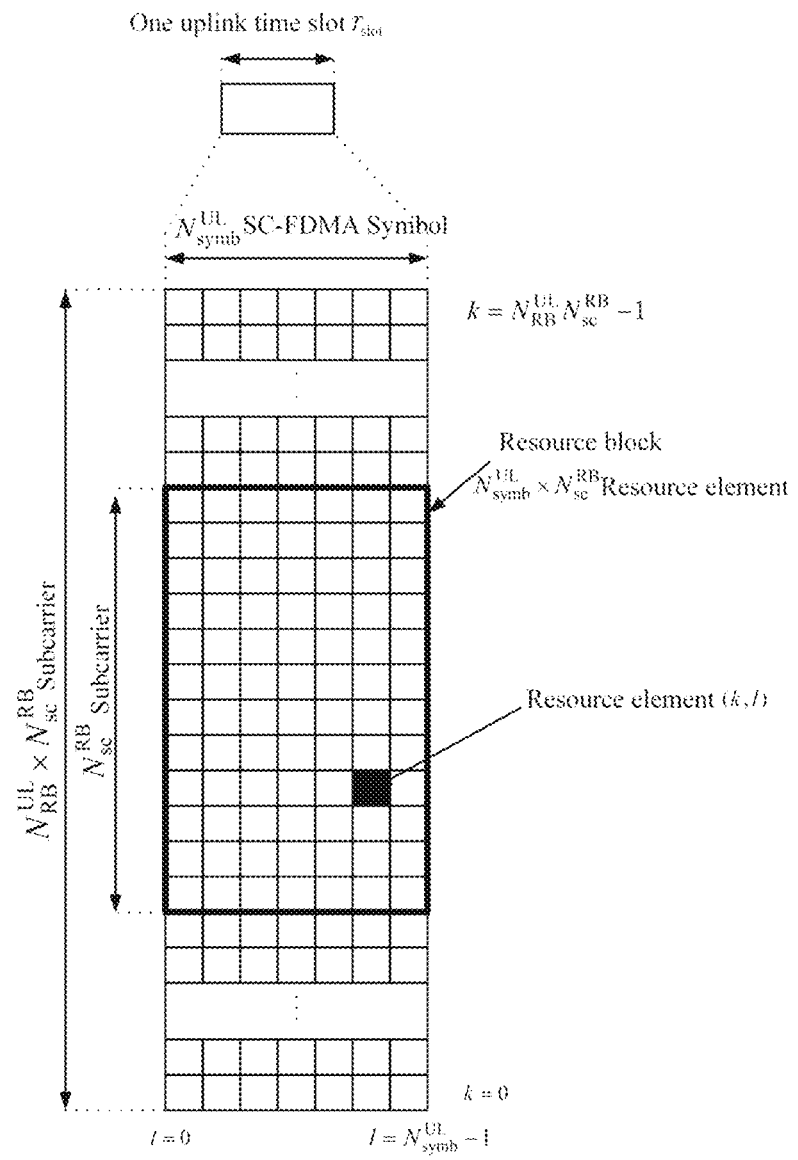
FIG. 7 is a structural diagram of a resource block (RB) of the LTE system in the existing art.
Figure 8:
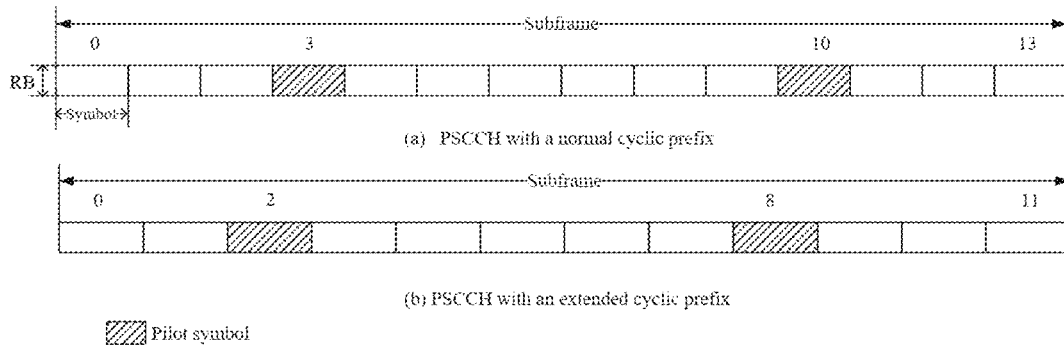
FIG. 8 is a structural diagram of a PSCCH resource in the existing art.

A system in this embodiment is provided with a PSCCH resource pool including a plurality of PSCCH resources. FIG. 7 is a structural diagram of a resource block (RB) of the LTE system in the existing art. As shown in FIG. 7, each PSCCH resource includes a subframe in time domain and a RB pair in frequency domain FIG. 8 is a structural diagram of a PSCCH resource in the existing art. The UE in the D2D/V2V system blindly detects and decodes the SCI in the PSCCH resource pool to obtain a corresponding control indication. Meanwhile, a decoding result and an energy detection result of the PSCCH resource provide a basis for the UE in the D2D/V2V system to perform resource scheduling or selection.

The UE performs at least of energy detection and decoding on each PSCCH resource in the PSCCH resource pool and determines a priority of the PSCCH resource represented by a priority index and a priority level. By determining the priority of each PSCCH resource in the PSCCH resource pool, the UE may perform PSCCH resource selection or report a part or all of the PSCCH resource priority information to an eNB to provide reference for the eNB to perform the PSCCH resource scheduling.

Figure 9:
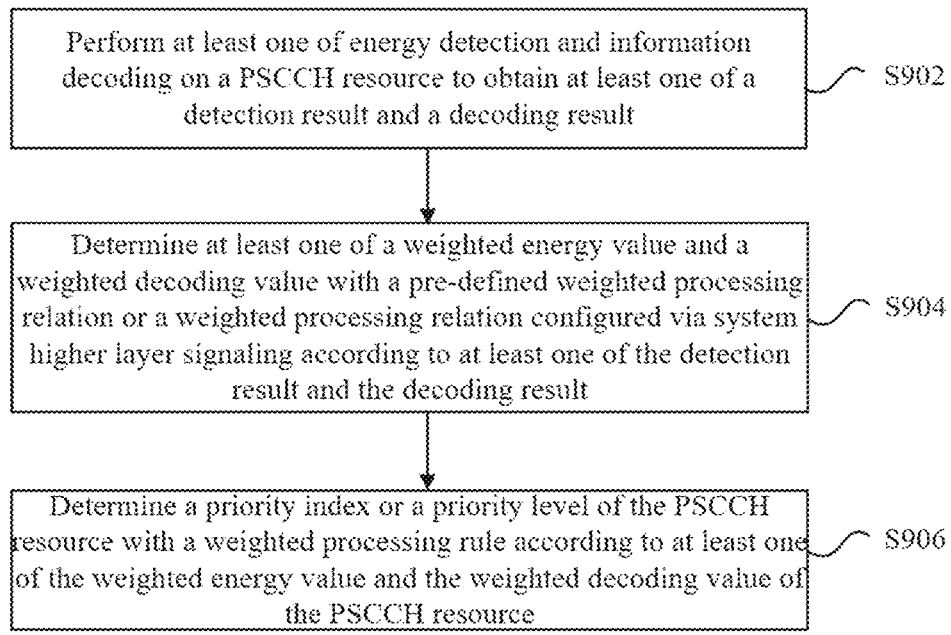
FIG. 9 is a schematic diagram illustrating a process for determining a priority of a PSCCH resource by a method 1 in an embodiment of the present disclosure.
Figure 10:
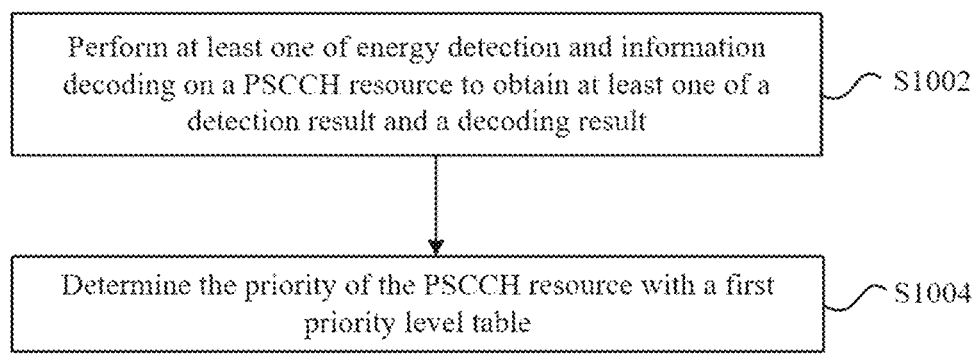
FIG. 10 is a schematic diagram illustrating a process for determining a priority of a PSCCH resource by a method 2 in an embodiment of the present disclosure.

The method for performing at least one of energy detection and information decoding on the PSCCH resource to determine the priority of the PSCCH resource includes two manners. FIG. 9 is a schematic diagram illustrating a process for determining a priority of a PSCCH resource by a manner 1 in an embodiment of the present disclosure. FIG. 10 is a schematic diagram illustrating a process for determining a priority of a PSCCH resource by a manner 2 in an embodiment of the present disclosure.

Manner 1: Weighted Processing

As shown in FIG. 9, the process for determining the priority of the PSCCH resource by the method 1 in this embodiment includes the steps: S902-S906.

In S902, at least one of energy detection or information decoding is performed on a PSCCH resource to obtain at least one of a detection result and a decoding result. The energy detection is performed on the PSCCH resource to obtain an energy value or a power value as the detection result. The information decoding is performing on SCI carried on the PSCCH resource and whether the decoding is correct or incorrect is determined as the decoding result.

In S904, at least one of a weighted energy value and a weighted decoding value is determined with a pre-defined weighted processing relation or a weighted processing relation configured via system higher layer signaling according to at least one of the detection result and the decoding result. The at least one of the weighted energy value and the weighted decoding value may be determined with the pre-defined weighted processing relation or the weighted processing relation configured via system higher layer signaling according to at least one of the detected energy value and the detected power value and the information decoding result.

In S906, a priority index or a priority level of the PSCCH resource is determined with a weighted processing rule according to at least one of the weighted energy value and the weighted decoding value of the PSCCH resource.

Manner 2: Table Look-Up

As shown in FIG. 10, the process for determining the priority of the PSCCH resource by the method 2 in this embodiment includes S1002-S1004.

In S1002, at least one of energy detection and information decoding is performed on a PSCCH resource to obtain at least one of a detection result and a decoding result.

In S1004, the priority of the PSCCH resource is determined with a first priority level table.

In the manner 2, the first priority level table is configured according to a system pre-definition or via higher layer signaling. According to at least one of the energy detection result and the information decoding result of the PSCCH resource, the priority level of the PSCCH resource may be determined uniquely by looking up the table.

In both of the manner 1 and the manner 2, at least one of the energy detection and the information decoding needs to be performed on the PSCCH resource.

The method for performing the energy detection on the PSCCH resource may include at least one of the following steps: the energy detection is performed on a resource element (RE) for mapping pilot in the PSCCH resource to obtain a pilot energy value or a pilot power value; and the energy detection is performed on all REs in the PSCCH resource to obtain a total energy value or a total power value of the PSCCH resource.

The energy value or the power value E is determined by performing the energy detection on the PSCCH resource to obtain a detection result of the energy detection.

The method for performing the information decoding on the PSCCH resource may include: receiving and decoding the PSCCH resource and checking whether the decoding result is correct or incorrect according to a SCI format carried on the PSCCH resource to obtain an information decoding result of the PSCCH resource.

The priority is determined by the manner 1 or the manner 2 according to at least one of the energy detection result and the information decoding result of the PSCCH resource.

In the manner 1, the weighted processing needs to be performed on at least one of the energy detection result and the information decoding result of the PSCCH resource. The weighted processing manner may include at least one of the following:

the corresponding weighted value is determined with a first correspondence according to the energy value or the power value obtained by performing the energy detection on the PSCCH resource. The first correspondence defines the weighted energy value corresponding to the energy value or the power value of the PSCCH resource; and the weighted decoding value is determined with a second correspondence according to the information decoding result of the PSCCH resource. The second correspondence defines a weighted value corresponding to a correct information decoding result and a weighted value corresponding to an in correct information decoding result.

In an exemplary embodiment, the priority of the PSCCH resource may be determined by processing the at least one of the weighted energy value and the weighted decoding value of the PSCCH resource according to a weighted processing rule. The priority of the PSCCH resource is represented by the priority index or the priority level.

In an exemplary embodiment, the weighted processing rule used for processing the at least one of the weighted energy value and the weighted decoding value of the PSCCH resource may be performing a linear operation on the at least one of the weighted energy value and the weighted decoding value of the PSCCH, and determining the priority of the PSCCH resource.

The weighted processing rule may include, but is not limited to, the following methods:

the weighted energy value and the weighted decoding value of the PSCCH are added together to determine the priority index of the PSCCH resource;

the weighted energy value and the weighted decoding value of the PSCCH are multiplied respectively by corresponding weighted coefficients, and the multiplied weighted energy value and the multiplied weighted decoding value are added together to determine the priority index of the PSCCH resource; and the weighted energy value is multiplied by the weighted decoding value of the PSCCH to determine the priority index of the PSCCH resource.

In an exemplary embodiment, the priority index may be converted into the priority level with a priority index-level conversion table according to a priority index-level conversion table and the obtained priority index of the PSCCH resource. The priority index-level conversion table defines the priority level uniquely corresponding to any priority index. In this way, the priority index of the PSCCH resource may be converted into the corresponding priority level.

In an exemplary embodiment, the weighted processing rule may be: determining the priority of the PSCCH resource with a second priority level table according to the at least one of the weighted energy value and the weighted decoding value of the PSCCH. The second priority level table defines the priority level uniquely corresponding to at least one of any weighted energy value and any weighted decoding value.

In the method 2, the table look-up needs to be performed on at least one of the energy detection result and the information decoding result of the PSCCH resource. The table look-up method may include the following: the priority level of the PSCCH resource may be uniquely determined with the first priority level table according to at least one of the energy detection result and the information decoding result of the PSCCH resource. The first priority level table defines the priority level of the PSCCH resource corresponding to at least one of any energy detection result and any information decoding result.

In the method 1 or the method 2, one or more of the following may be configured according to the system pre-definition or according to an indication from a network-side via higher layer signaling: the first priority level table, the first correspondence, the second correspondence, the weighted processing rule, the priority index-level conversion table and the second priority level table.

If not in collision, the methods for determining the priority of the PSCCH resource described above may be combined with each other in any way. A PSCCH resource priority list may be formed by determining priorities of the plurality of PSCCH resources. The PSCCH resource priority list may provide reference information for a network side to schedule and configure the PSCCH resources for the UE or provide a basis for the UE to compete for or select the PSCCH resources.

The network side may include one or more of the entities: an evolved NodeB (eNB), a Relay Node (RN), a Multi-cell Coordination Entity (MCE), a GateWay (GW), a Mobile Management Entity (MME), an Evolved Universal Terrestrial Radio Access Network (EUTRAN), and an Operation Administration and Maintenance (OAM) Manager.

The following description is made using an example in which an eNB is used as a network-side entity.

Example 1

The UE performs the energy detection on the PSCCH to obtain the energy value or the power value. The energy detection performed on the PSCCH may include at least one of the following: energy or power of pilot RE(s) in each PSCCH resource is detected to determine the energy value or the power value; or total energy or total power of all REs in each PSCCH resource is detected to determine the energy value or the power value.

The weighted energy value of the PSCCH resource is determined with the first correspondence pre-defined by the system according to the determined power value or the determined energy value.

An example of the first correspondence is shown in table 1. Assuming that the pilot power on the PSCCH resource measured by the UE is E, the weighted energy value k may be determined by referring to the following table:

TABLE 1

| index | Energy/Power Value E | Weighted Value k |
|---|---|---|
| 0 | E < E0 | k0 |
| 1 | E0 ≤ E < E1 | k1 |
| 2 | E1 ≤ E < E2 | k2 |
| ... | ... | ... |
| n | En − 1 ≤ E < En | kn |
| ... | ... | ... |
| N | EN − 1 ≤ E | kN |

Example 2

The UE blindly detects the SCI information on each PSCCH resource and determines whether the valid SCI information is carried. If the decoding result is checked as correct, the SCI information is obtained on the PSCCH resource; otherwise the SCI is decoded incorrectly. An example of the second correspondence is shown in table 2. The UE blindly detects the SCI information on the PSCCH resource. If the SCI information is decoded correctly, the weighted decoding value is s0; if the SCI information is decoded incorrectly and not obtained, the weighted decoding value is s1.

TABLE 2

| index | Information Decoding | Weighted Value k |
|---|---|---|
| 0 | Correct | s0 |
| 1 | Incorrect | s1 |

Example 3

After the UE performs the energy detection and the information decoding on a certain PSCCH resource, the weighted energy value is k2 and the weighted decoding value is s0, and the priority index P of the PSCCH resource is determined according to the weighted processing rule.

If the weighted processing rule pre-defined by the system is to add the weighted energy value and the weighted decoding value of the PSCCH resource, the priority index of the PSCCH resource is P=k2+s0.

When the weighted processing rule pre-defined by the system is to multiply the weighted energy value and the weighted decoding value of the PSCCH resource by corresponding weighted coefficients and add the multiplied weighted energy value and the multiplied weighted decoding value, and it is defined that the weighted coefficient of the weighted energy value is K and the weighted coefficient of the weighted decoding value is S, the priority index of the PSCCH resource is as follows: P=K*k2+S*s0;

If the adopted weighted processing rule according to an indication from the system via higher layer signaling is to multiply the weighted energy value by the weighted decoding value of the PSCCH, the priority index of the PSCCH resource is P=k2*s0.

The UE may determine the priority index of the PSCCH resource by the weighted processing rule adopted by the system according to at least one of the energy detection result and the information decoding result of the PSCCH.

Example 4

The priority index of the PSCCH resource determined with the weighted processing rule according to at least one of the weighted energy value and the weighted decoding value may provide more elaborate priority information. Considering the further resource selection or the reporting of resource priority information, the priority of the PSCCH resource may be further converted as follows: an elaborate priority index P is converted into a priority level R. That is, a correspondence table between the priority index and the priority level is defined. An example of the priority index-level conversion table is shown as table 3.

TABLE 3

| index | Priority Index P | Priority level R |
|---|---|---|
| 0 | P < P0 | r0 |
| 1 | P0 ≤ P < P1 | r1 |
| 2 | P1 ≤ P < P2 | r2 |
| ... | ... | ... |
| m | Pm − 1 ≤ P < Pm | rm |
| ... | ... | ... |
| M | PM − 1 ≤ P | rM |

Example 5

The priority of the PSCCH resource may be determined by looking up the second priority level table and according to at least one of the weighted energy value and the weighted decoding value of the PSCCH. The second priority level table defines the priority level uniquely corresponding to any weighted energy value and any weighted decoding value. An example of the second priority level table is shown as table 4.

TABLE 4

| | Weighted Decoding Value s | |
|---|---|---|
| Weighted Energy Value k | s0 | s1 |
| k0 | r0 | r1 |
| k1 | r2 | r3 |
| k2 | r4 | r5 |
| ... | ... | ... |
| kn | r2n | r2n + 1 |
| ... | ... | ... |
| kN | r2N | r2N + 1 |

In the table, r0, r1, . . . , r2N+1 refer to the priority level.

Example 6

The first priority level table defines the priority level of the PSCCH resource corresponding to at least one of any energy detection result and any information decoding result. The priority level of the PSCCH resource may be uniquely determined by looking up the first priority level table and according to at least one of the energy detection result and the information decoding result of the PSCCH resource.

An example of the first priority level table is shown as table 5.

TABLE 5

| | Information Decoding Result | |
|---|---|---|
| Energy Value/Power Value E | Correct | Incorrect |
| E < E0 | r0 | r1 |
| E0 ≤ E < E1 | r2 | r3 |
| E1 ≤ E < E2 | r4 | r5 |
| ... | ... | ... |
| En − 1 ≤ E < En | r2n | r2n + 1 |
| ... | ... | ... |
| EN − 1 ≤ E | r2N | r2N + 1 |

In the table, r0, r1, . . . , r2N+1 denote the priority level.

Embodiment 4

The embodiment of the present disclosure provides a machine-readable medium. In this embodiment, the machine-readable medium may be configured to store program codes for executing the steps: S1-S2.

In S1, at least one of the following operations is performed on a physical sidelink control channel (PSCCH): performing energy detection to obtain a detection result or performing information decoding to obtain a decoding result.

In S2, at least one of the detection result and the decoding result is weighted to determine a priority of a PSCCH resource, or the priority of the PSCCH resource is determined according to at least one of the detection result and the decoding result.

In an exemplary embodiment, the machine-readable medium described above may include, but is not limited to, a U disk, a read-only memory (ROM), a random access memory (RAM), a mobile hard disk, a magnetic disk, an optical disk or another medium capable of storing the program codes.

In this embodiment, a processor may perform at least one of the following operations on the PSCCH: performing the energy detection to obtain the detection result and performing the information decoding to obtain the decoding result according to the program codes stored in the machine-readable medium.

In this embodiment, the processor may weight at least one of the detection result and the decoding result to determine the priority of the PSCCH resource or determine the priority of the PSCCH resource according to at least one of the detection result and the decoding result, according to the program codes stored in the machine-readable medium.

For examples in this embodiment, reference may be made to the examples described in the embodiments and exemplary embodiments described above, and the examples will not be repeated in this embodiment.

The embodiments of the present application further provide a machine-readable medium configured to store computer-executable instructions for executing the method for processing the resource priority in the embodiment shown in FIG. 3 when executed by a processor.

It will be understood by those skilled in the art that functional modules/units in all or part of the steps of the method, the system and the device disclosed above may be implemented as software, firmware, hardware and appropriate combinations thereof. In the hardware implementation, the division of functional modules/units mentioned in the above description may not correspond to the division of physical components. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a machine-readable medium (such as a computer-readable medium). The computer-readable medium may include a computer storage medium (or a non-transitory medium) and a communication medium (or a transitory medium). As is known to those skilled in the art, the term, computer storage media, includes volatile and nonvolatile, removable and non-removable media implemented in any method or technology for storing information (such as computer-readable instructions, data structures, program modules or other data). The computer storage media include, but are not limited to, RAM, ROM, EEPROM, flash memory or other memory technologies, CD-ROM, digital versatile disc (DVD), or other optical disc storage, magnetic cassette, magnetic tape, magnetic disk storage or other magnetic storage devices, or any other media used for storing desired information and accessible by the computer. In addition, as is known to those skilled in the art, the communication media generally include computer-readable instructions, data structures, program modules or other data in modulated data signals such as carriers or other transmission mechanisms, and may include any information delivery medium.

The above are only exemplary embodiments of the present application and are not intended to limit the present application, and for those skilled in the art, the present application may have various modifications and variations. Any modifications, equivalent substitutions, improvements and the like made within the spirit and principle of the present invention should fall within the scope of the present application.

INDUSTRIAL APPLICABILITY

Embodiments of the present application provide the method for determining the resource priority, the processing device and the processing system, and the UE, resolving the problem of the low resource utilization efficiency in the existing art, improving the resource utilization rate, and reducing the interference.

What is claimed is:

1. A method for determining a resource priority, comprising:
   performing, on a physical sidelink control channel (PSCCH), at least one of the following operations:
   performing energy detection to obtain a detection result, or performing information decoding to obtain a decoding result; and
   weighting at least one of the detection result or the decoding result to determine a priority of a PSCCH resource;
   wherein the weighting at least one of the detection result and the decoding result to determine the priority of the PSCCH resource comprises:
   acquiring at least one of the following: a first correspondence between a value of the detection result of the PSCCH resource and a weighted energy value, or a second correspondence between the decoding result of the PSCCH resource and a weighted decoding value;
   performing at least one of the following operations: determining, according to the detection result and the acquired first correspondence, the weighted energy value corresponding to the detection result; or determining, according to the decoding result and the acquired second correspondence, the weighted decoding value corresponding to the decoding result; and
   determining the priority of the PSCCH resource according to at least one of the determined weighted energy value or the determined weighted decoding value; and
   wherein the method is performed by at least one processor.

2. The method of claim 1, wherein the performing the energy detection on the PSCCH to obtain the detection result comprises at least one of the following:
   detecting pilot energy or pilot power on the PSCCH resource to obtain the detection result; or
   detecting total energy or total power on the PSCCH resource to obtain the detection result;
   wherein the obtained detection result comprises an energy value or a power value.

3. The method of claim 2, wherein the detecting the pilot energy or the pilot power on the PSCCH resource to obtain the detection result comprises: detecting signal energy or signal power of a resource element (RE) for mapping pilot in the PSCCH resource, or signal energy or signal power of a symbol for mapping the pilot in the PSCCH resource; or
   the detecting the total energy or the total power on the PSCCH resource to obtain the detection result comprises: detecting signal energy or signal power of all REs in the PSCCH resource;

wherein the PSCCH resource comprises a subframe in time domain and a resource block (RB) pair in frequency domain.

4. The method of claim 1, wherein the performing the information decoding on the PSCCH to obtain the decoding result comprises: receiving and decoding sidelink control information (SCI) carried on the PSCCH resource, and determining whether the decoding result is correct or incorrect.

5. The method of claim 1, wherein the weighting at least one of the detection result or the decoding result to determine the priority of the PSCCH resource comprises:
determining the priority of the PSCCH resource with a weighted processing rule according to at least one of the weighted energy value or the weighted decoding value of the PSCCH;
wherein the priority of the PSCCH resource comprises at least one of the following: a priority index or a priority level.

6. The method of claim 5, wherein the weighted processing rule comprises: performing a linear operation on the at least one of the weighted energy value or the weighted decoding value of the PSCCH, and determining the priority of the PSCCH resource according to a result of the linear operation.

7. The method of claim 5, wherein the weighted processing rule comprises: determining the priority of the PSCCH resource with a second priority level table according to the at least one of the weighted energy value or the weighted decoding value of the PSCCH; wherein the second priority level table defines the priority level uniquely corresponding to the at least one of the weighted energy value or the weighted decoding value.

8. The method of claim 1, wherein after the priority of the PSCCH resource is determined, the method further comprises:
performing, by a user equipment (UE), at least one of selection or competition of the PSCCH resources according to a PSCCH resource priority list; or
reporting, by the UE, the PSCCH resource priority list to a network side via at least one of physical layer signaling or higher layer signaling to enable the network side to schedule PSCCH resources according to the PSCCH resource priority list; wherein the PSCCH resource priority list comprises priority information of the PSCCH resources.

9. A user equipment (UE) for determining a resource priority, comprising:
a processor configured to perform, on a physical sidelink control channel (PSCCH), at least one of the following operations: energy detection to obtain a detection result, or information decoding to obtain a decoding result; and
a determiner configured to weight at least one of the detection result or the decoding result to determine a priority of a PSCCH resource;
wherein the determiner is configured to weight at least one of the detection result or the decoding result to determine the priority of the PSCCH resource by the following:
acquiring at least one of the following: a first correspondence between a value of the detection result of the PSCCH resource and a weighted energy value, or a second correspondence between the decoding result of the PSCCH resource and a weighted decoding value;
performing at least one of the following operations:
determining, according to the detection result and the acquired first correspondence, the weighted energy value corresponding to the detection result; or determining, according to the decoding result and the acquired second correspondence, the weighted decoding value corresponding to the decoding result; and
determining the priority of the PSCCH resource according to the at least one of the determined weighted energy value or the determined weighted decoding value.

10. The UE of claim 9, wherein the processor is configured to perform the energy detection on the PSCCH to obtain the detection result by at least one of the following:
detecting pilot energy or pilot power on the PSCCH resource to obtain the detection result; or
detecting total energy or total power on the PSCCH resource to obtain the detection result;
wherein the obtained detection result comprises an energy value or a power value.

11. The UE of claim 10, wherein the processor is configured to detect the pilot energy or pilot power on the PSCCH resource to obtain the detection result by detecting signal energy or signal power of a resource element (RE) for mapping pilot in the PSCCH resource or detecting signal energy or signal power of a symbol for mapping the pilot in the PSCCH resource; or
the processor is configured to detect the total energy or the total power on the PSCCH resource to obtain the detection result by detecting signal energy or signal power of all REs in the PSCCH resource;
wherein the PSCCH resource comprises a subframe in time domain and a resource block (RB) pair in frequency domain.

12. The UE of claim 9, wherein the processor is configured to perform the information decoding on the PSCCH to obtain the decoding result by receiving and decoding sidelink control information (SCI) carried on the PSCCH resource, and determine whether the decoding result is correct or incorrect.

13. The UE of claim 9, wherein the determiner is configured to weight the at least one of the detection result and the decoding result to determine the priority of the PSCCH resource by:
determining the priority of the PSCCH resource with a weighted processing rule according to the at least one of the weighted energy value and the weighted decoding value of the PSCCH;
wherein the priority of the PSCCH resource comprises at least one of a priority index and a priority level.

14. The UE of claim 13, wherein the weighted processing rule comprises:
performing a linear operation on the at least one of the weighted energy value and the weighted decoding value of the PSCCH, and determining the priority of the PSCCH resource according to a result of the linear operation.

15. The UE of claim 13, wherein the weighted processing rule comprises: determining the priority of the PSCCH resource with a second priority level table according to the at least one of the weighted energy value and the weighted decoding value of the PSCCH; wherein the second priority level table defines the priority level uniquely corresponding to the at least one of the weighted energy value or the weighted decoding value.

16. The UE of claim 9, wherein the determiner is configured to determine the priority of the PSCCH resource according to at least one of the detection result or the decoding result by:

determining the priority of the PSCCH resource with a first priority level table according to the at least one of the detection result or the decoding result of the PSCCH resource; wherein the first priority level table defines a priority level uniquely corresponding to the at least one of the detection result or the decoding result of the PSCCH resource, and the detection result of the PSCCH resource comprises an energy value or a power value.

17. The UE of claim 9, further comprising at least one of a selector or a reporter;
wherein the selector is configured to perform at least one of selection or competition of the PSCCH resource according to a PSCCH resource priority list after the determining module determines the priority of the PSCCH resource; or
the reporter is configured to report the PSCCH resource priority list to a network side via at least one of physical layer signaling or higher layer signaling after the determining module determines the priority of the PSCCH resource; wherein the PSCCH resource priority list comprises priority information of a plurality of PSCCH resources.

* * * * *